(12) United States Patent
Wu

(10) Patent No.: US 10,396,840 B2
(45) Date of Patent: Aug. 27, 2019

(54) HIGH SPEED SHORT REACH INPUT/OUTPUT (I/O)

(71) Applicant: INTEL CORPORATION, Santa Clara, CA (US)

(72) Inventor: Zuoguo Wu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 234 days.

(21) Appl. No.: 14/142,595

(22) Filed: Dec. 27, 2013

(65) Prior Publication Data

US 2015/0188589 A1    Jul. 2, 2015

(51) Int. Cl.
*H04B 1/38* (2015.01)
*H04L 25/02* (2006.01)
*H04L 25/49* (2006.01)

(52) U.S. Cl.
CPC .............. *H04B 1/38* (2013.01); *H04L 25/026* (2013.01); *H04L 25/0278* (2013.01); *H04L 25/0284* (2013.01); *H04L 25/0298* (2013.01); *H04L 25/4908* (2013.01)

(58) Field of Classification Search
CPC ..... H04B 1/38; H04L 25/026; H04L 25/0278; H04L 25/0284; H04L 25/0298; H04L 25/4908
See application file for complete search history.

(56) References Cited

U.S. PATENT DOCUMENTS 6,690,309 B1  2/2004 James et al.
7,262,630 B1 *  8/2007 Andrews .......... H03K 19/17744
326/26
7,541,947 B2  6/2009 Bae et al.
7,574,647 B1  8/2009 Newcomb et al.
2001/0000428 A1  4/2001 Abadeer et al.
2002/0184544 A1  12/2002 Svestka et al.
(Continued)

FOREIGN PATENT DOCUMENTS

CN    101079684 A    11/2007
CN    101617494 A    12/2009
(Continued)

OTHER PUBLICATIONS

International Search Report and the Written Opinion for International Application No. PCT/US2014/066838, dated Feb. 26, 2015, 12 pages.
(Continued)

*Primary Examiner* — Eric T Oberly
(74) *Attorney, Agent, or Firm* — Womble Bond Dickinson (US) LLP

(57) ABSTRACT

Described is an apparatus which comprises: a plurality of transmitter circuits on a first die; a plurality of receiver circuits on a second die; a plurality of data transmission lines communicatively coupling the first die to the second die for the plurality of transmitter circuits to transmit data bits in parallel to the plurality of receiver circuits; a termination circuit comprising a shared capacitor and a plurality of resistors, each corresponding to one of the plurality of conductive lines and each coupled to the shared capacitor; and a parallel coding block to code data transmitted by the plurality of transmitter circuits via the plurality of data transmission lines according to a direct current (DC) balanced code.

17 Claims, 6 Drawing Sheets

(56) References Cited

U.S. PATENT DOCUMENTS

| | | |
|---|---|---|
| 2006/0214276 A1 | 9/2006 | Kazi et al. |
| 2007/0204204 A1* | 8/2007 | Sul ................. H03M 5/145 714/776 |
| 2007/0229320 A1* | 10/2007 | Bae ................. H03M 5/145 341/50 |
| 2010/0188097 A1* | 7/2010 | Sul ................. G01R 31/31717 324/537 |
| 2011/0293041 A1* | 12/2011 | Luo ................. H04L 5/20 375/316 |
| 2012/0081138 A1 | 4/2012 | Sul et al. |
| 2013/0127645 A1 | 5/2013 | Shibata |

FOREIGN PATENT DOCUMENTS

| | | |
|---|---|---|
| CN | 101965708 A | 2/2011 |
| CN | 102292647 A | 12/2011 |
| CN | 102460974 A | 5/2012 |
| EP | 1407366 A2 | 4/2004 |
| JP | 63-081548 U | 5/1988 |
| JP | 2010-520715 A | 6/2010 |
| TW | 200810372 A | 2/2008 |
| TW | 200811873 A | 3/2008 |
| WO | 2010-146715 A1 | 12/2010 |
| WO | 2013-095561 A1 | 6/2013 |
| WO | 2013095561 A1 | 6/2013 |

OTHER PUBLICATIONS

Notification Concerning Transmittal of International Preliminary Report on Patentability issued for International Patent Application No. PCT/US2014/066838, dated Jul. 7, 2016.
Supplementary European Search Report for European Patent Application No. 14874870.0 dated Jul. 18, 2017, 8 pages.
Japanese Office Action with Translation, 14 pages.
Chinese Office Action dated May 3, 2018, (9 pages).
CN Office Action dated Feb. 27, 2019 for CN Application No. 201480064935 (10 pages of English translation and 6 pages of Original document).

* cited by examiner

HIGH SPEED SHORT REACH INPUT/OUTPUT (I/O)

BACKGROUND

High bandwidth, short reach interconnections between chips or devices using conventional input/output (I/O) interfaces require significant power and chip area; specifically, solutions to maintain signal transfer quality between said chips or devices significantly contributes to the interface power consumption and smaller chip area. As a result, these conventional I/O interfaces are not desirable for low power and/or small chip area circuits.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified.

DESCRIPTION OF THE EMBODIMENTS

Figure 1:
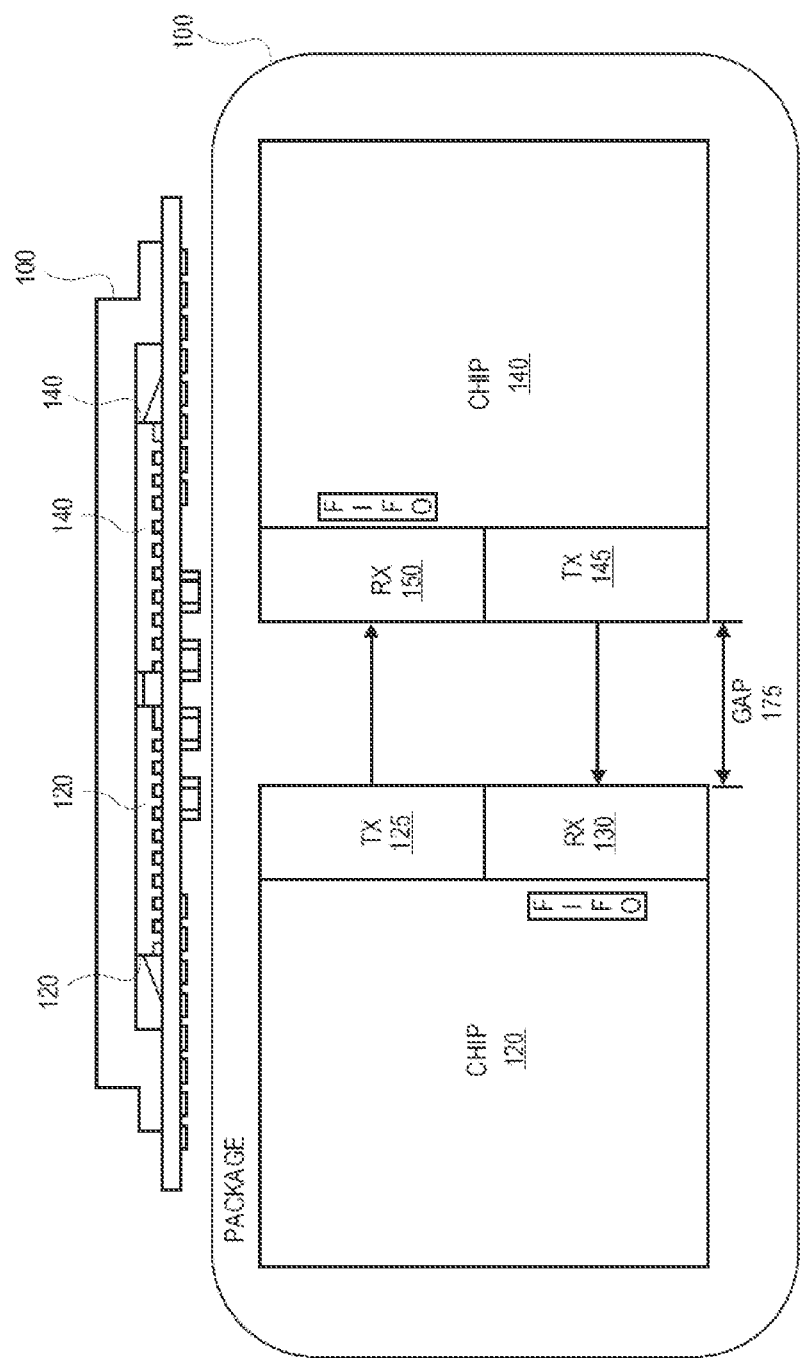
FIG. 1 is a block diagram of a multichip package (MCP) to utilize a high speed short reach input/output interface, according to an embodiment of the disclosure.

Embodiments of the disclosure describe high speed short reach input/output (I/O) couplings for circuits and devices. In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 is a block diagram of a multichip package (MCP) 100 to utilize a high speed short reach I/O interface according to an embodiment of the disclosure. FIG. 1 illustrates both a side view and a top view of MCP 100, which is shown to include chip 120 utilizing transmission circuits (TX) 125 and receiving circuits (RX) 130, and chip 140 (separated by gap 175) utilizing TX 145 and RX 150. In this embodiment, the short reach I/O interface described below comprises an on-package input/output (OPIO) interface communicatively coupling at least two chips. The following exemplary embodiment is described as having two chips with interfaces; however, any number of chips within a package can be interconnected using the techniques described herein.

Package 100 may be any type of package that may contain multiple integrated circuit (IC) chips. In the example of FIG. 1, package 100 contains chip 120 and chip 140. These chips may be, for example, processors, memory chips, graphics processors, etc.

In this embodiment, chip 120 includes OPIO transmitters 125 and OPIO receivers 130. Similarly, chip 140 includes OPIO transmitters 145 and OPIO receivers 150. Transmitters 125 are coupled with receivers 150 and transmitters 145 are coupled with receivers 130. Gap 175 between chip 120 and chip 140 is relatively small (e.g., less than 20 mm), thereby comprising a "short reach"; however, other embodiments may have larger gaps between chips. In general, the smaller gap 175, the greater the bandwidth that may be provided between chips. The interfaces between transmitter 125 and receiver 150, and between transmitter 145 and receiver 130 may comprise any of the high speed short reach I/O interfaces described below.

As described in further detail below, embodiments of the disclosure describe a high speed, short reach I/O interface for discrete ICs or MCP computing devices. Embodiments of the disclosure include a plurality of transmitter circuits on a first die, a plurality of receiver circuits on a second die, and a plurality of data transmission lines communicatively coupling the first die to the second die. The plurality of transmitter circuits are to transmit data bits in parallel to the plurality of receiver circuits. Embodiments of the disclosure further include a termination circuit comprising a shared capacitor and a plurality of resistors—each corresponding to one of the plurality of conductive lines and each coupled to the shared capacitor, and a parallel coding block for coding the data transmitted by the plurality of transmitter circuits via the plurality of data transmission lines, wherein said data is coded according to a DC balanced code.

The architecture described above may be utilized to connect, for example, a processor core on one die to a memory or cache on another die within a single package to provide very high bandwidth with low power consumption. The memory may be, for example, a dynamic random access memory (DRAM), an embedded DRAM (eDRAM), stacked DRAM, non-volatile memory (e.g., flash memory, phase change memory (PCM)), etc. In one embodiment, the interfaces described herein may provide an order of magnitude lower energy per bit and area per bandwidth efficiencies as compared to traditional I/O interfaces.

Various embodiments of the architectures described in FIG. 1 may include one or more of the following examples. A processor die and one or more memory dice (e.g., DRAM, eDRAM, stacked DRAM, flash, PCM) connected using a high speed short reach I/O interface. Multiple memory devices (e.g., DRAM, eDRAM, stacked DRAM, flash, PCM) connected to a high speed short reach I/O interface. A logic circuit used to combine multiple lower bandwidth connection, for example, multiple through silicon via (TSV) interfaces into a high speed short reach I/O interface. The memory device may be, for example, a stacked DRAM nor stacked non-volatile memory.

The interface of FIG. 1 is optimized to operate between two dies that are relatively closely positioned within a package. However, there may be a need to couple a die with a packaged component to also reside within the package housing chip 120 and chip 140. When providing an interface to a packaged die, different physical characteristics must be considered.

The interfaces described herein can provide a high bandwidth, low power to connect a packaged die to, for example, a memory device (dynamic random access memory (DRAM), stacked DRAM) that may sit within the package. In one embodiment, one or more dies may be packaged before assembled within another package. The package may be, for example a ball grid array (BGA) package or a wafer-level package.

Figure 2:
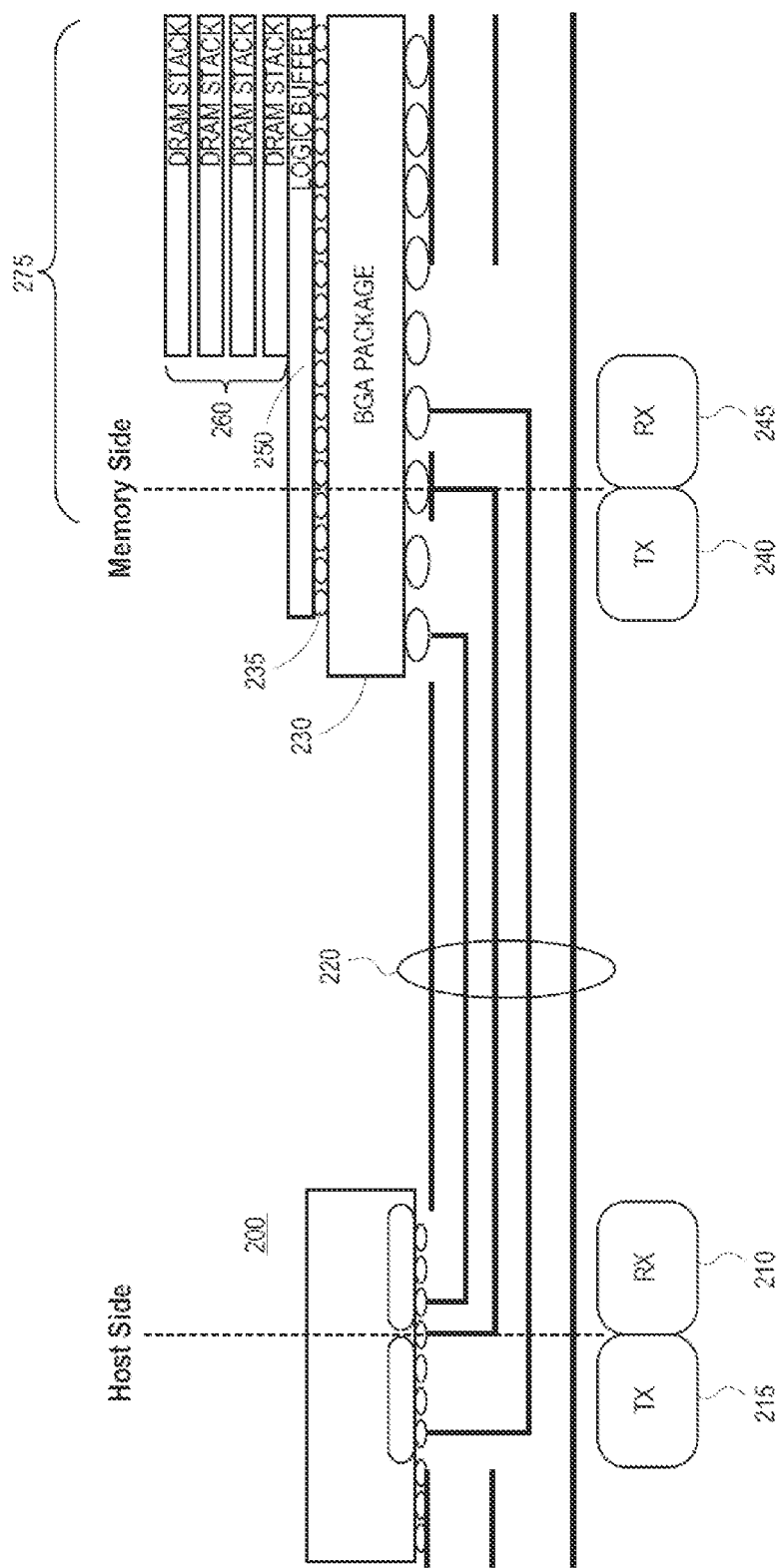
FIG. 2 is a block diagram of packaged components to utilize a high speed short reach input/output interface, according to an embodiment of the disclosure.

FIG. 2 is a block diagram of packaged components 200 and 275 to utilize a high speed short reach I/O interface 220 according to an embodiment of the disclosure. The example of FIG. 2 includes host (e.g., a processor) 200 in one package and utilizing TX 215 and RX 210 coupled with device 275 (shown to include package interface 235 providing an interface between package 230 and logic buffer 250, and DRAM stack 260) utilizing TX 240 and RX 245; thus, host 200 and device 275 are housed in separate packages. The interface of FIG. 1 is generally utilized within a single package; however, similar concepts can be applied to the interface between packages.

The interface of FIG. 2 provides a high speed short reach I/O interface between host 200 and device 275. The short reach in this example may comprise a few inches or less. In one embodiment, one or more components within device 275 may utilize the interface of FIG. 1. The example of FIG. 2 is shown to include a stacked memory device; however, other types of devices can also be supported.

In the example of FIG. 2, host 200 and device 275 are packaged separately. The packages may be, for example ball grid array (BGA) packages or wafer-level packages that may be assembled on or within another package.

In one embodiment, the interface of FIG. 2 includes a tunable source-terminated receiver, data bus inversion (DBI) encoding of data/commands, a sense amplifier receiver, and/or a differential forwarded clock (to overcome clock noise and receiver training).

In one embodiment, host 200 includes transmitter 215 and receiver 210 that are coupled with device 275 through a package interface (e.g., BGA) and lines 220. Device package 230 includes counterpart receiver 245 and transmitter 240 coupled with lines 220.

In one embodiment, transmitter 240 and receiver 245 are coupled with lines 220 through package interface 235. Package interface 235 provides an interface between package 230 and logic buffer 250. In one embodiment, logic buffer 250 is coupled with DRAM stack 260 utilizing the interface described with respect to FIG. 1.

Figure 3:
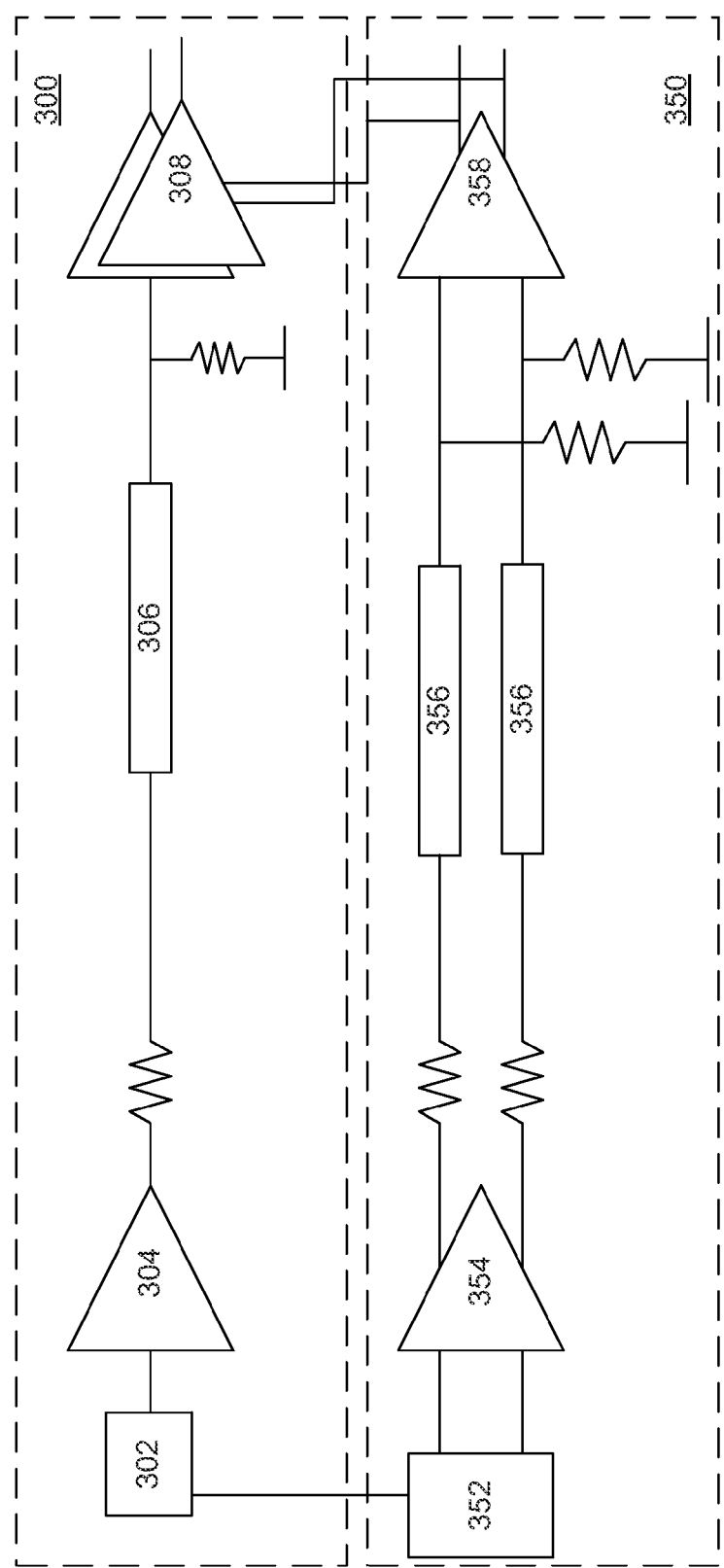
FIG. 3 is an illustration of a prior art serial input/output interface.

FIG. 3 is an illustration of a prior art serial I/O interface. This figure illustrates this interface to include data TX/RX circuits 300 (having data source 302, data transmission buffer 304, channel 306, and data reception buffer 308) and clock TX/RX circuits 350, shown to include phase locked loop (PLL) 352 to generate a clock signal for transmission buffer 354 to transmit to receive buffer 358 via channels 356.

PLL 352 also forwards the generated clock signal to data source 302 of data TX/RX circuits 300. Said clock signal may be forwarded as a half-rate forwarded clock, which allows the recovery of data from a serial data signal whose bit rate is twice the frequency of oscillation. Data transmission buffer 304 transmits serial data to data reception buffer 308 via channel 306. As illustrated in this figure, data reception buffer 308 comprises a tri-state buffer controlled by the output of clock receiver buffer 358; in this example, said clock signal is phase aligned to correct any phase misalignment during signal transmission.

Figure 4:
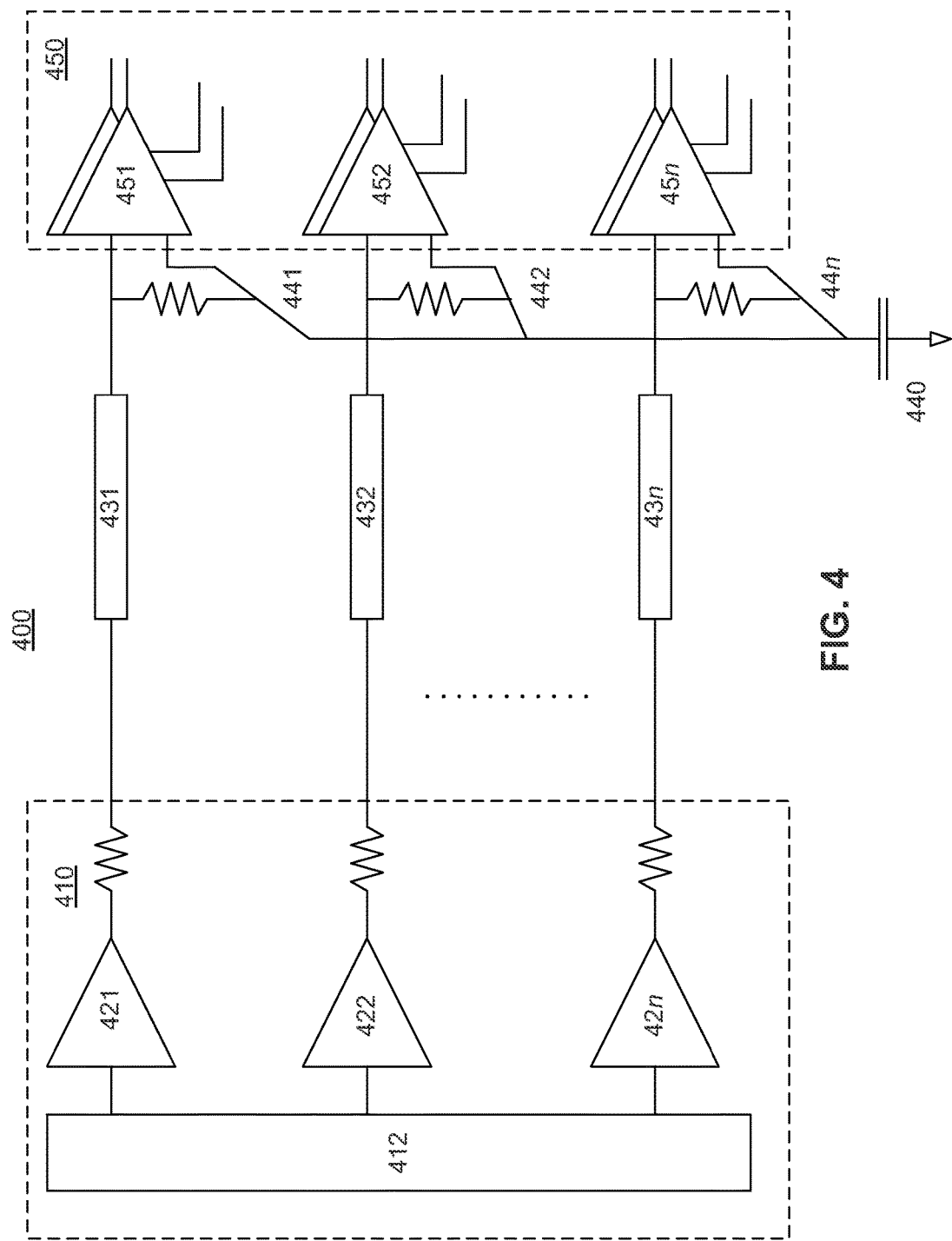
FIG. 4 is an illustration of a high-speed short reach input/output interface, according to an embodiment of the disclosure.

FIG. 4 is an illustration of a high-speed short reach I/O interface 400 according to an embodiment of the disclosure. In this embodiment, interconnect 400 is utilized by transmission circuits 410 and receiver circuits 450. Transmission circuits 410 include data coding block 412 and data transmission buffers 421, 422 . . . 42n. Receiver circuits 450 include data reception buffers 451, 452 . . . 45n; each of said buffers are respectively coupled via channels 431, 432 . . . 43n (which are shown to have corresponding termination resistances 441, 442 . . . 44n coupled to shared capacitor 440). To simplify the explanation below, clock channel and clock recovery circuitry are not shown.

In high speed serial communication links, in order for digital data (i.e., a serial bit steam of 1's and 0's) to be deciphered at the high speeds, it is desirable to transmit a digital data stream with a balanced number of 1's and 0's to maintain signal transfer quality. An electronic signal with a balanced number of voltage transitions is referred to as a direct current (DC) balanced signal. A DC balanced signal is important to prevent signal saturation, loss of signal quality, and to ensure correct I/O link operation in an alternating current (AC) coupled system.

DC balanced encoding schemes may include, but are not limited to, constant weight codes, paired disparity codes (e.g., bipolar encoding, 8b10b encoding schemes), scrambling codes, etc. For the purposes of explanation only, exemplary embodiments below are described as utilizing an 8b10b encoding scheme.

In an 8b10b encoding scheme, there are 1,024 10-bit code-words available to represent 256 8-bit words. From the 1,024 available 10-bit code-words, some words are selected to represent each 8-bit word; these words are typically somewhat "balanced" with respect to the number of 1's and 0's present in the word (i.e., each selected 10-bit code-word includes an equal or near equal number of 1's and 0's). Furthermore, for DC balanced codes such as 8b10b encoding schemes, while the resulting encoded word is DC balanced, the encoded word does not necessarily have to be fully balanced for each data block (e.g., the 10-bit code word "00 1010 1101" is not a fully balanced data block). Only the long term average of 0's and 1's needs to be balanced. The instantaneous difference of 0's and 1's is bounded but not necessarily zero.

Data coding block 412 encodes transmission data via a DC balanced code so that the parallel transmitted data (i.e., the data driven on channels 431, 432 . . . 43n by transmission buffers 421-42n) is DC balanced. Thus, in an exemplary embodiment where 8b10b code is used, n would be equal to ten; in another embodiment where 4b5b code is used, n would be five. In other embodiments, the number of transmission buffers, channels and reception buffers may comprise a number less than the size of the data coding block output. Thus, in an exemplary embodiment where 8b10b code is used, n may be less than ten (although, the number of "balanced" code words for transmission would be correspondingly reduced).

In this embodiment, parallel data channels 431-43n are each shown to be coupled to a termination resistor (shown as resistors 441, 442 . . . 44n), and are all coupled to shared alternating current (AC) capacitor 440, which in this embodiments is shown to be coupled to ground. This capacitor blocks all DC power from the parallel data transmission (i.e., the DC balanced transmission from the parallel blocks because it is shared between lanes).

Proper termination of signal lines reduces or eliminates the problems caused by signal reflections. Some known termination solutions are implemented as a resistor that is coupled between a signal line and a power supply node. In this embodiment, because all lines share the same termination node, the dissipation in this node is not limited, and therefore may be referred to herein as "floating;" however, due to the DC balance of the parallel transmission, it becomes feasible to use shared floating receiver termination.

Due to the long term DC balanced nature of the data driven to channels 431-43n, the shared termination node $V_{ref}$ will settle to the mid-point of the TX swing. As there is no requirement for equal 1's and 0's in each clock cycle, there will be drift in $V_{ref}$; however, data coded via coding block 412 has a bounded running disparity, and therefore the $V_{ref}$ drift is limited. More importantly, the voltage at receiving circuits 450 drifts in the same direction, cancelling most of the errors. Thus, this embodiment is much less sensitive to $V_{ref}$ error, which is typically a serious challenge in single-ended I/O (such as the prior art serial I/O interconnect illustrated in FIG. 3). For an example, if $V_{cc}$ is 1V and the RX input eye height is 100 mV, a $V_{ref}$ drift of 50 mV will completely close the eye for a standard single-ended I/O. In this topology, the same drift may simply nominally reduce the eye height.

Thus, in the above described exemplary embodiment, by utilizing DC balanced coding such as 8b10b in parallel way (rather than the prior art, which utilizes such codes for high speed serial I/O interfaces), better signal transfer quality may be achieved. Using the floating shared receiver termination of resistors 441-44n and shared AC capacitor 440, I/O power is reduced significantly. Compared to single-ended short reach I/O solutions, embodiments of the disclosure have better link margins, enabling a potentially higher data rate. Compared to differential I/O solutions, embodiments of the disclosure have a smaller pin count.

Figure 5:
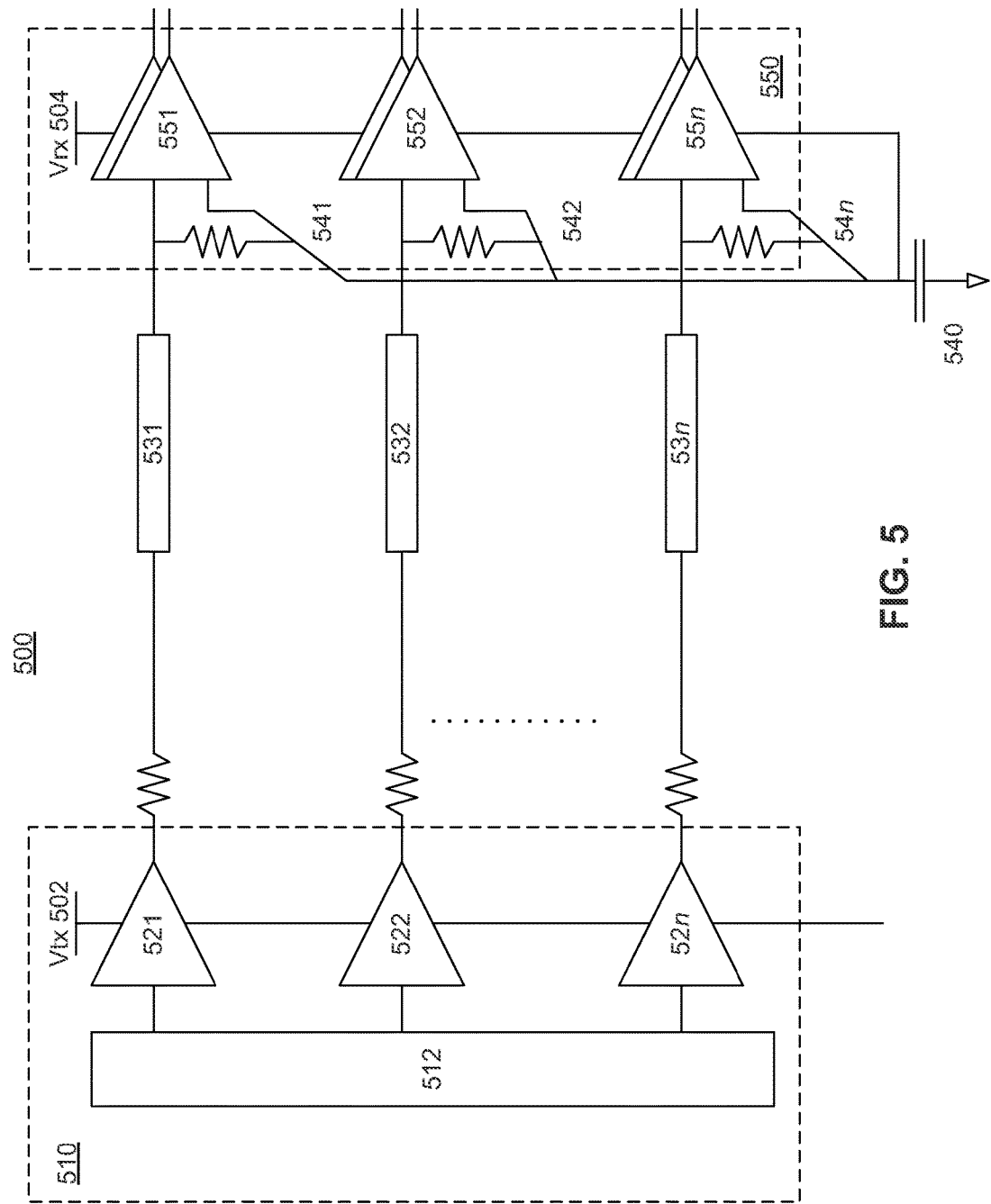
FIG. 5 is an illustration of a high-speed short reach input/output interface, according to an embodiment of the disclosure.

FIG. 5 is an illustration of a high-speed short reach I/O interface 500 according to an embodiment of the disclosure. In this embodiment, interconnect 500 includes transmission circuits 510 and receiver circuits 550. Transmission circuits 510 include data coding block 512 and data transmission buffers 521, 522 . . . 52n. Receiver circuits 550 includes data reception buffers 551, 552 . . . 55n; each of said buffers are respectively coupled via channels 531, 532 . . . 53n (which are shown to have corresponding termination resistances 541, 542 . . . 54n coupled to shared capacitor 540).

Data coding block 512 encodes transmission data via a DC balanced code so that the parallel transmitted data (i.e., the data driven on channels 531, 532 . . . 53n by transmission buffers 521-52n) is DC balanced. In this embodiment, parallel data channels 531-53n are each shown to be coupled to a termination resistor (shown as resistors 541, 542 . . . 54n), and are all coupled to shared AC capacitor 540, which shown to be coupled to supply voltage 504 (described further below). This capacitor blocks all DC power from the parallel data transmission (i.e., the DC balanced transmission from the parallel blocks because it is shared between lanes).

Similar to the embodiments of FIG. 4 described above, interconnect 500 includes a "floating" termination circuit of resistors 541-54n coupled to shared capacitor 540. This termination circuit allows for transmission circuits 510 and reception circuits 550 to have different power rails—shown as power rails 502 and 504, as long as the $V_{ref}$ is within the reception circuits common mode range. Thus, the above described embodiment maintains signal transfer quality for transmission and reception circuits operating at different supply voltages (e.g., TX/RX components included in ICs from different manufacturers).

Figure 6:
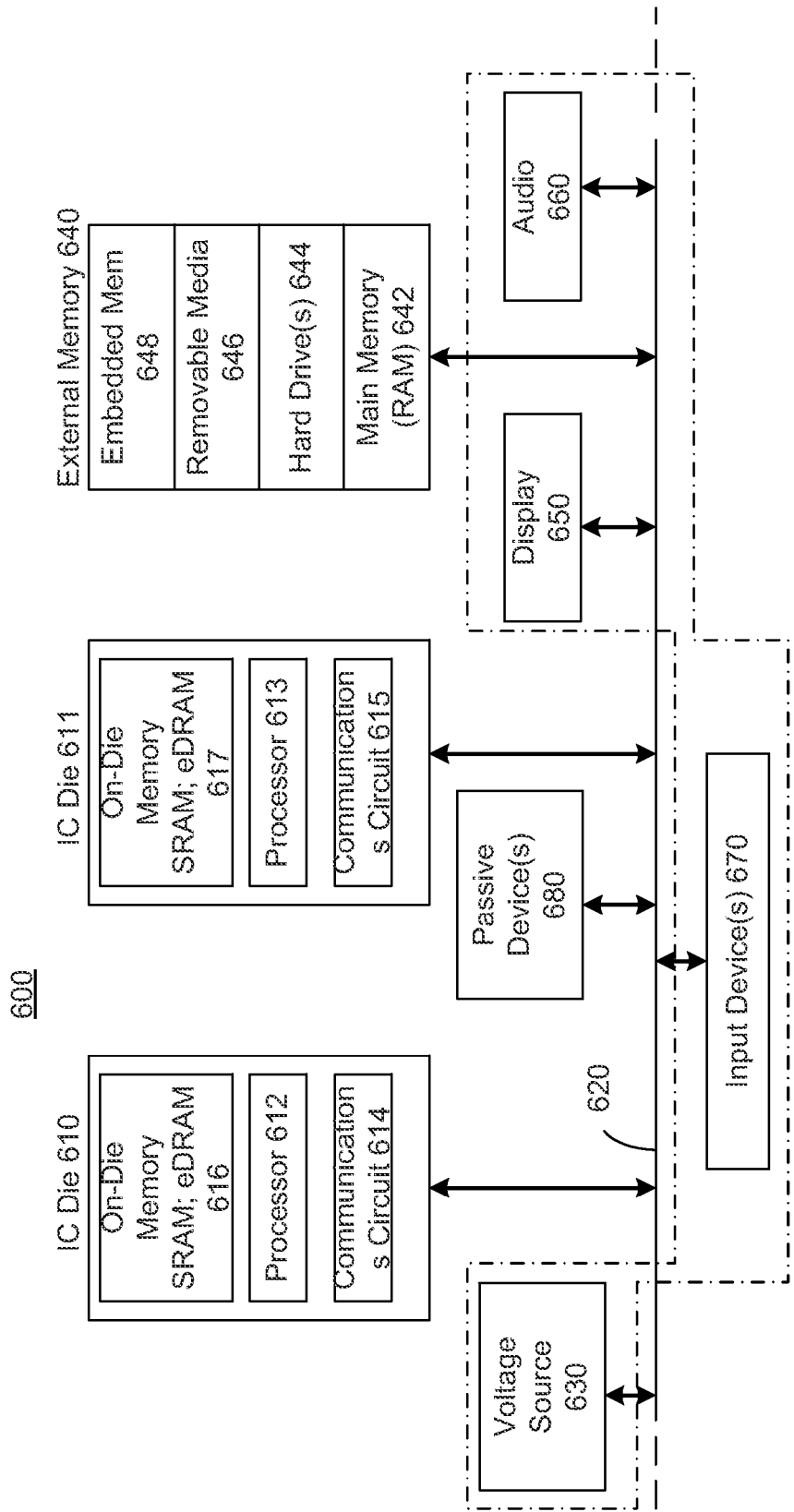
FIG. 6 is an illustration of a computer system to utilize an embodiment of the disclosure.

FIG. 6 is an illustration of a computer system 600 to utilize an embodiment of the disclosure. Computer system 600 (also referred to as the electronic system 600) as depicted may comprise components utilizing any of the high speed short reach I/O interfaces described above. Computer system 600 may be a mobile device such as a netbook computer. Computer system 600 may be a mobile device such as a wireless smart phone. Computer system 600 may be a desktop computer. The computer system 600 may be a hand-held reader. Computer system 600 may be a wearable computing device.

In an embodiment, system 600 is a computer system that includes system bus 620 to electrically couple the various components of the electronic system. System bus 620 is a single bus or any combination of busses according to various embodiments. System 600 includes voltage source 630 that provides power to integrated circuit 610. In some embodiments, the source 630 supplies current to integrated circuit 610 through system bus 620.

Integrated circuit 610 is electrically coupled to system bus 620 and includes any circuit, or combination of circuits according to an embodiment. In an embodiment, integrated circuit 610 includes processor 612 that can be of any type. As used herein, processor 612 may mean any type of circuit such as, but not limited to, a microprocessor, a microcontroller, a graphics processor, a digital signal processor, or another processor. In an embodiment, SRAM embodiments are found in memory caches of the processor. Other types of circuits that can be included in integrated circuit 610 are a custom circuit or an application-specific integrated circuit (ASIC), such as communications circuit 614 for use in wireless devices such as cellular telephones, smart phones, pagers, portable computers, two-way radios, and similar electronic systems. In an embodiment, processor 610 includes on-die memory 616 such as static random-access memory (SRAM). In an embodiment, processor 610 includes embedded on-die memory 616 such as embedded dynamic random-access memory (eDRAM).

In an embodiment, integrated circuit 610 is complemented with subsequent integrated circuit 611. Useful embodiments include dual processor 613 and dual communications circuit 615 and dual on-die memory 617 such as SRAM. In an embodiment, dual integrated circuit 611 includes embedded on-die memory 617 such as eDRAM.

In an embodiment, electronic system 600 also includes an external memory 640 that in turn may include one or more memory elements suitable to the particular application, such as main memory 642 in the form of RAM, one or more hard drives 644, and/or one or more drives that handle removable media 646, such as diskettes, compact disks (CDs), digital variable disks (DVDs), flash memory drives, and other removable media known in the art. External memory 640 may also be embedded memory 648 such as the first die in an embedded TSV die stack, according to an embodiment.

In an embodiment, electronic system 600 also includes display device 650 and audio output 660. In an embodiment, electronic system 600 includes an input device such as controller 670 that may be a keyboard, mouse, trackball, game controller, microphone, voice-recognition device, or any other input device that inputs information into electronic system 600. In an embodiment, input device 670 is a camera. In an embodiment, input device 670 is a digital sound recorder. In an embodiment, input device 670 is a camera and a digital sound recorder.

As shown herein, integrated circuit 610 may be implemented in a number of different embodiments that utilize the high speed short reach I/O interfaces according to any of the several disclosed embodiments and their equivalents, an electronic system, a computer system, one or more methods of fabricating an integrated circuit, and one or more methods of fabricating an electronic assembly that includes a semiconductor package having high speed short reach I/O interfaces according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed semiconductor package having transistors to utilize any of the previously discussed high speed short reach I/O interfaces and their equivalents. A foundation substrate may be included, as represented by the dashed line of FIG. 6. Passive devices 680 may also be included, as is also depicted in FIG. 6.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the disclosure but to illustrate it. The scope of the disclosure is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Embodiments of the disclosure may describe a plurality of transmitter circuits on a first die, a plurality of receiver circuits on a second die, a plurality of conductive lines communicatively coupling the first die to the second die for the plurality of transmitter circuits to transmit data bits in parallel to the plurality of receiver circuits, a termination circuit comprising a shared capacitor and a plurality of resistors, each corresponding to one of the plurality of conductive lines and each coupled to the shared capacitor, and a parallel coding block to encode data transmitted by the plurality of transmitter circuits via the plurality of conductive lines according to a direct current (DC) balanced code.

In some embodiments, the parallel coding clock to encode the transmitted data to n bits, and the plurality of conductive lines comprises n lines. In other embodiments, the parallel coding clock to encode the transmitted data to n bits, and the plurality of conductive lines comprises less than n lines.

In some embodiments, the DC balanced code used by the parallel coding block comprises at least one of 8b10b coding scheme, a scrambling coding scheme, or a constant weight coding scheme. In some embodiments, the parallel coding block is capable to generate encoded data having an unequal number of 0's and 1's in each data block and a bounded disparity between overall number of 0's and 1's.

In some embodiments, the termination circuit is further coupled to ground, or is further coupled to a power supply voltage. In some embodiments, the plurality of transmitter circuits and the plurality of receiver circuits are each coupled to different power supply rails.

In some embodiments, the first die and the second die are both included in a multi-chip package (MCP). In other embodiments, the first die and the second die are each included in separate integrated circuit (IC) packages.

Embodiments of the disclosure may describe a system comprising a processor, a memory, a wireless interface for allowing the processor to communicate with another device, and a short reach input/output (I/O) interconnecting the processor and the memory. The short reach I/O comprises a plurality of transmitter circuits on a first die, a plurality of receiver circuits on a second die, a plurality of conductive lines communicatively coupling the first die to the second die for the plurality of transmitter circuits to transmit data bits in parallel to the plurality of receiver circuits, a termination circuit comprising a shared capacitor and a plurality of resistors, each corresponding to one of the plurality of conductive lines and each coupled to the shared capacitor, and a parallel coding block to encode data transmitted by the plurality of transmitter circuits via the plurality of conductive lines according to a direct current (DC) balanced code.

In some embodiments, the parallel coding clock of the short reach I/O to encode the transmitted data to n bits, and the plurality of conductive lines comprises n lines. In other embodiments, the parallel coding clock of the short reach I/O to encode the transmitted data to n bits, and the plurality of conductive lines comprises less than n lines.

In some embodiments, the DC balanced code used by the parallel coding block of the short reach I/O comprises at least one of 8b10b coding scheme, a scrambling coding scheme, or a constant weight coding scheme. In some embodiments, the parallel coding block of the short reach I/O may generate encoded data having an unequal number of 0's and 1's in each data block and a bounded disparity between overall number of 0's and 1's.

In some embodiments, the processor and the memory are both included in a multi-chip package (MCP). In other embodiments, the processor and the memory are each included in separate integrated circuit (IC) packages.

Embodiments of the disclosure may describe an apparatus comprising a parallel coding block to encode data for transmitting by a plurality of transmitter circuits via a plurality of conductive lines according to a direct current (DC) balanced code. In some embodiments, the parallel coding clock to encode the transmitted data to n bits, and the plurality of conductive lines comprises n lines. In other embodiments, the parallel coding clock to encode the transmitted data to n bits, and the plurality of conductive lines comprises less than n lines.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
  a plurality of transmitter circuits on a first die;
  a plurality of receiver circuits on a second die;
  a plurality of conductive lines communicatively coupling the first die to the second die for the plurality of transmitter circuits to transmit data bits in parallel to the plurality of receiver circuits;
  a termination circuit comprising a single shared capacitor, a plurality of termination resistors, and a plurality of reception buffers, each termination resistor corresponding to one of the plurality of conductive lines and one of the reception buffers having a first input and a second input and coupled to the single the shared capacitor, wherein each termination resistor corresponding to one of the reception buffers has a first end connected to the first input and a second end connected to the second input of the corresponding reception buffer and the single shared capacitor, wherein the single shared capacitor is to block direct current (DC) power from the parallel transmission of data bits on the conductive lines; and
  a parallel coding block to encode data transmitted by the plurality of transmitter circuits via the plurality of conductive lines according to a DC balanced code.

2. The apparatus of claim 1, wherein the parallel coding block to encode the transmitted data to n bits, and the plurality of conductive lines comprises n lines.

3. The apparatus of claim 1, wherein the parallel coding block to encode the transmitted data to n bits, and the plurality of conductive lines comprises less than n lines.

4. The apparatus of claim 1, wherein the DC balanced code used by the parallel coding block comprises at least one of 8b10b coding scheme, a scrambling coding scheme, or a constant weight coding scheme.

5. The apparatus of claim 1, wherein the parallel coding block is capable to generate encoded data having an unequal number of 0's and 1's in each data block and a bounded disparity between overall number of 0's and 1's.

6. The apparatus of claim 1, wherein the termination circuit is further coupled to ground.

7. The apparatus of claim 1, wherein the termination circuit is further coupled to a power supply voltage.

8. The apparatus of claim 1, wherein the plurality of transmitter circuits and the plurality of receiver circuits are each coupled to different power supply rails.

9. The apparatus of claim 1, wherein the first die and the second die are both included in a multi-chip package (MCP).

10. The apparatus of claim 1, wherein the first die and the second die are each included in separate integrated circuit (IC) packages.

11. A system comprising:
a processor;
a memory;
a short reach input/output (I/O) interconnecting the processor and the memory, the short reach I/O comprising:
a plurality of transmitter circuits on a first die;
a plurality of receiver circuits on a second die;
a plurality of conductive lines communicatively coupling the first die to the second die for the plurality of transmitter circuits to transmit data bits in parallel to the plurality of receiver circuits;
a termination circuit comprising a single shared capacitor and a plurality of termination resistors, each termination resistor corresponding to one of the plurality of conductive lines and one of the receiver circuits having a first input and a second input and coupled to the single shared capacitor, wherein each termination resistor corresponding to one of the receiver circuits has a first end connected to the first input and a second end connected to the second input of the corresponding receiver circuit and the shared capacitor, wherein the shared capacitor is to block direct current (DC) power from the parallel transmission of data bits on the parallel conductive lines; and
a parallel coding block to encode data transmitted by the plurality of transmitter circuits via the plurality of conductive lines according to a DC balanced code; and
a wireless interface for allowing the processor to communicate with another device.

12. The system of claim 11, wherein the parallel coding block of the short reach I/O to encode the transmitted data to n bits, and the plurality of conductive lines comprises n lines.

13. The system of claim 11, wherein the parallel coding block of the short reach I/O to encode the transmitted data to n bits, and the plurality of conductive lines comprises less than n lines.

14. The system of claim 11, wherein the DC balanced code used by the parallel coding block of the short reach I/O comprises at least one of 8b10b coding scheme, a scrambling coding scheme, or a constant weight coding scheme.

15. The system of claim 11, wherein the parallel coding block of the short reach I/O may generate encoded data having an unequal number of 0's and 1's in each data block and a bounded disparity between overall number of 0's and 1's.

16. The system of claim 11, wherein the processor and the memory are both included in a multi-chip package (MCP).

17. The system of claim 11, wherein the processor and the memory are each included in separate integrated circuit (IC) packages.

* * * * *